US006968971B2

(12) United States Patent
Ely

(10) Patent No.: US 6,968,971 B2
(45) Date of Patent: Nov. 29, 2005

(54) ENDCAP ASSEMBLY FOR A STOWAGE BIN

(75) Inventor: Paul Alexander Ely, Monroe, WA (US)

(73) Assignee: The Boeing Company, Chicago, IL (US)

( * ) Notice: Subject to any disclaimer, the term of this patent is extended or adjusted under 35 U.S.C. 154(b) by 306 days.

(21) Appl. No.: 10/214,342

(22) Filed: Aug. 7, 2002

(65) Prior Publication Data
US 2004/0026436 A1    Feb. 12, 2004

(51) Int. Cl.[7] .............. B65D 8/06; B65D 8/04; B65D 6/28
(52) U.S. Cl. ............... 220/627; 220/652
(58) Field of Search ........... 220/6, 7, 62, 62.11, 220/62.18, 626, 627, 918, 4.28, 531, 553, 220/628, 690, 729, 652; 206/485; 244/118.1; 229/120.02, 120.24, 120.26, 120.27, 120.28, 229/120.382; 312/246, 248

(56) References Cited

U.S. PATENT DOCUMENTS 4,120,443 A * 10/1978 Gardner et al. ............. 206/586
4,456,142 A *  6/1984 Burling ..................... 220/4.28
4,703,853 A * 11/1987 Byrns ..................... 206/387.13
6,164,477 A * 12/2000 Druckman et al. ............ 220/7

* cited by examiner

Primary Examiner—Nathan J. Newhouse
Assistant Examiner—Harry Grosso
(74) Attorney, Agent, or Firm—Vincent C. Ilagan, Esq.; Artz & Artz, P.C.

(57) ABSTRACT

An endcap assembly (10) for attachment to a front end of a stowage bin (12) is provided. The endcap assembly (10) includes an integral inner panel (16) and an outer panel (18) coupled to the inner panel (16). The integral inner panel (16) has one or more reduced thickness portions (26) and one or more brackets (22, 24) extending from the reduced thickness portions (26).

24 Claims, 4 Drawing Sheets

ENDCAP ASSEMBLY FOR A STOWAGE BIN

TECHNICAL FIELD

The present invention relates generally to composite sandwich panels that allow for separate individual brackets to be mounted thereon, and more particularly to composite sandwich panels having integral fold-up self-locking brackets for decreasing the number of components within an assembly having the sandwich panels.

BACKGROUND OF THE INVENTION

Numerous types of composite sandwich panels allow for separate brackets to be mounted thereon. One example is an inner panel typically integrated within an endcap assembly for an overhead stowage bin. The endcap assemblies are ordinarily utilized for providing a cosmetic closeout for the end of the stowage bin.

Existing endcap assemblies are normally comprised of multiple separate components, including an inner panel and an outer panel. Ordinarily, the inner panel is a composite sandwich panel attached to a front portion of the stowage bin. Bonding adhesives are typically utilized to attach at least one edge of the inner panel to the front portion of the bin. Furthermore, at least one edge of the outer panel is typically attached to the inner panel by way of a combination of bonding adhesives and connector brackets. The engagement between the outer panel and the inner panel typically leaves a relatively small space between the outer panel and the inner panel.

Typically, the inner panel has at least two separate brackets mounted thereon and disposed between the outer panel and the inner panel. These brackets usually are a separate load bearing bracket and a separate shelf bracket. The load bearing bracket is usually employed for providing support to the outer panel and preventing the outer panel from being crushed inwardly toward the inner panel. Moreover, the shelf bracket is normally utilized for defining a portion of the space between the inner panel and the outer panel, as well as for blocking objects, e.g. trash, from being inserted into the endcap assembly. These separate brackets are individually attached to both the inner panel and the outer panel. In particular, bonding or inserts with fasteners are usually employed for integrating these brackets within the endcap assembly.

A drawback of these endcap assemblies is that the multiplicity of components burdens manufacturers and suppliers with the responsibility of tracking and stocking each of these components. This responsibility is a substantial burden in view of the numerous stowage bins being manufactured for the many commercial carriers of the various modes of transportation. This burden results in a decrease in manufacturing efficiency and an increase in costs associated therewith. Such results are clearly undesirable.

Another drawback of these endcap assemblies is that the relatively high number of components increases installation time and costs associated therewith. Typically, manufacturers carefully align the brackets on the inner panel and the outer panel and then subsequently apply bonding adhesives and various other fasteners so as to secure each end of the brackets to the inner panel or the outer panel, respectively. In this regard, the relatively high number of components and the time required to handle each of these components increase the overall installation time of the endcap assembly on the stowage bin, as well as the costs associated therewith.

Yet another drawback of the multiplicity of components is that misalignment may occur within the endcap assembly because of the relatively high number of interfaces between the several individual components. To eliminate this misalignment additional tooling is often required which adds expense, makes configuration changes difficult and creates additional storage problems. Such a result is clearly disadvantageous.

Therefore, a need exists for a composite sandwich panel having integral fold-up brackets for decreasing the number of separate components within various assemblies thereby improving overall manufacturing and installation processes of numerous assemblies.

SUMMARY OF THE INVENTION

An embodiment of the claimed invention is an endcap assembly having an integral inner panel and an outer panel coupled to the inner panel. In this embodiment, the endcap assembly is coupled to an end portion of a stowage bin. The integral inner panel has one or more reduced thickness portions and one or more brackets extending from the reduced thickness portions. The integral inner panel has an outer panel coupled thereto with a space left therebetween.

One advantage of the invention is that an endcap assembly is provided that has a substantially strong lightweight construction.

Another advantage of the invention is that an endcap assembly is provided that can minimize the manufacturing cycle time, as well as costs associated therewith.

Yet another advantage of the invention is that an endcap assembly is provided for improving alignment of individual components or subassemblies therein.

Still another advantage of the invention is that an endcap assembly is provided that an endcap assembly is provided that can decrease the tracking and stocking responsibilities of suppliers and minimize the costs associated therewith.

The features, functions, and advantages can be achieved independently in various embodiments of the present invention or may be combined in yet other embodiments.

BRIEF DESCRIPTION OF THE DRAWINGS

For a more complete understanding of this invention, reference should now be made to the embodiments illustrated in greater detail in the accompanying drawings and described below by way of examples of the invention.

DETAILED DESCRIPTION OF THE PREFERRED EMBODIMENT

Figure 1:
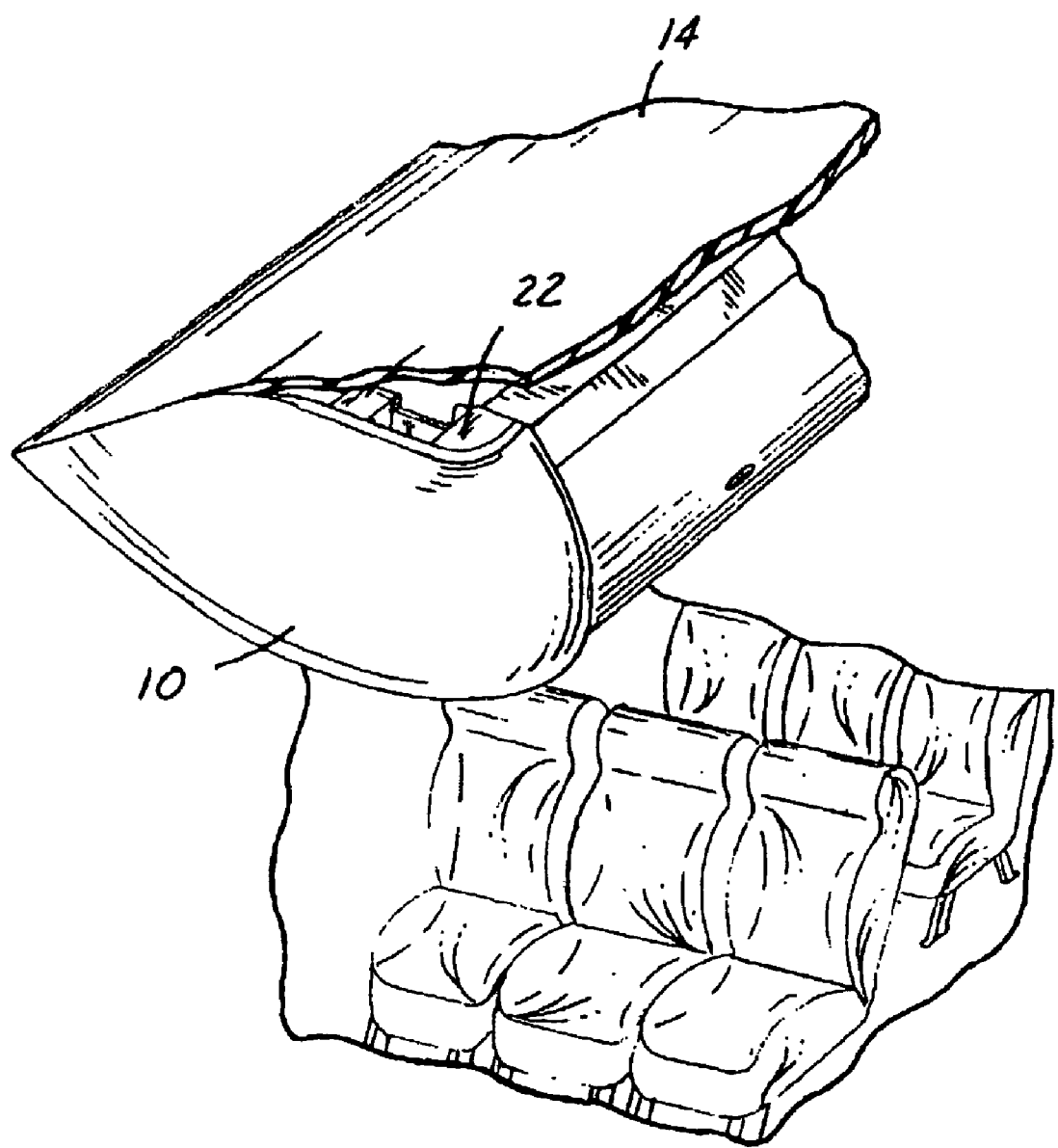
FIG. 1 is a perspective view of an overhead stowage bin having an endcap assembly, according to one advantageous embodiment of the claimed invention.

In the following figures the same reference numerals will be used to illustrate the same components in the various views. The present invention is particularly suited for a composite sandwich panel of an endcap assembly 10 that defines a front portion of available space within an overhead stowage bin of a commercial airliner. However, it is understood that the present invention may be utilized within a variety of other assemblies that require one or more composite sandwich panels.

Referring to FIG. 1, there is shown an endcap assembly 10 attached to a front portion of an overhead stowage bin 12 adjacent to a ceiling 14 of a passenger cabin, in accordance with one advantage embodiment of the claimed invention. The endcap assembly 10 preferably defines a front perimeter for the available storage space within the stowage bin 12. Of course, a person skilled in the art will understand that the endcap assembly 10 may be attached to stowage bins in a variety of other suitable manners.

Figure 2:
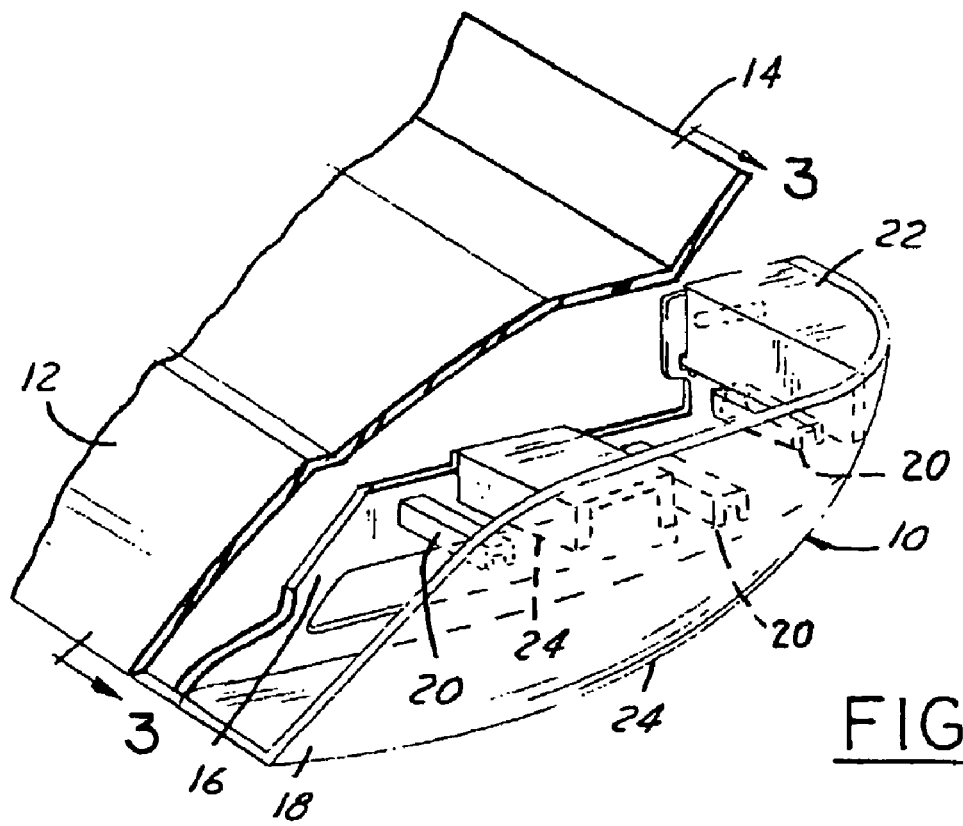
FIG. 2 is a partially cutaway perspective view of the overhead stowage bin shown in FIG. 1, illustrating the endcap assembly having an integral inner panel and an outer panel coupled to the integral inner panel.

Referring now to FIG. 2, there is generally shown a partially cutaway perspective view of the endcap assembly shown in FIG. 1. In general, the endcap assembly 10 preferably includes an integral inner panel 16 attached to the front portion of the overhead stowage bin 12. Preferably, adhesive bonding is utilized to attach an outer edge of the integral inner panel 16 to the front portion of the stowage bin 12. Furthermore, the integral inner panel 16 is also coupled to an outer panel 18 in a manner leaving a space between the integral inner panel 16 and the outer panel 18. As one skilled in the art would also understand, one or more separate connector brackets 20 may be used to attach the outer panel 18 to the integral inner panel 16. These brackets 20 extend from the outer panel 18 through one or more bracket holes 34 integrally fanned within the inner panel 16. The end of each bracket 20 is bolted or otherwise connected to an exterior surface of the inner panel 16. In addition, bonding adhesives may also be used to attach he outer panel 18 to the integral inner panel 16.

Figure 3:
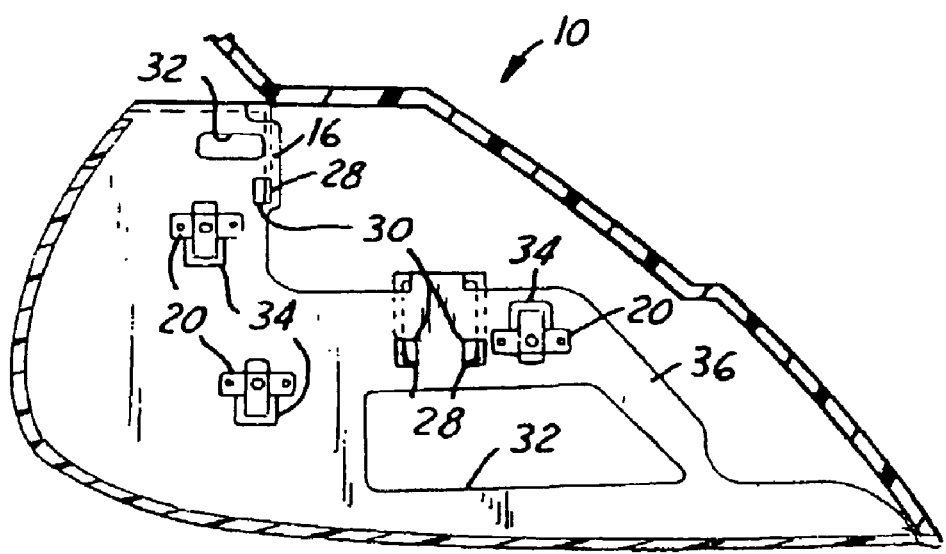
FIG. 3 is a rear plan view of the endcap assembly, as shown in FIG. 2 and taken along line 3—3.

In this embodiment, the integral inner panel 16 includes a shelf bracket 22 and a load bearing bracket 24, both integrally fanned in the integral inner panel 16 and extending therefrom. As best shown in FIG. 3, the shelf bracket 22 is intended to mate against the ceiling panel 14 and the outer panel 18 for the purpose of preventing debris and other objects from falling into the space between the outer panel 18 and the integral inner panel 16 of the endcap assembly 10. In this respect, the shell bracket 22 is beneficial because as is known in the art various objects or debits may otherwise fall into the endcap assembly 10 without the shelf bracket 22. For example, without the bracket 22, an airline passenger who is standing in the aisle and waiting to disembark an airplane may rest his hand on the endcap assembly 10 and accidentally drop his cellular phone or keys into the endcap assembly 10.

Moreover, the load bearing bracket 24 is intended to contact the outer panel 18 and prevent the outer panel 18 from being crushed inwardly toward the integral inner panel 16. Such a result is beneficial because it is widely known that axial loads are commonly applied to endcap assemblies.

Figure 4:
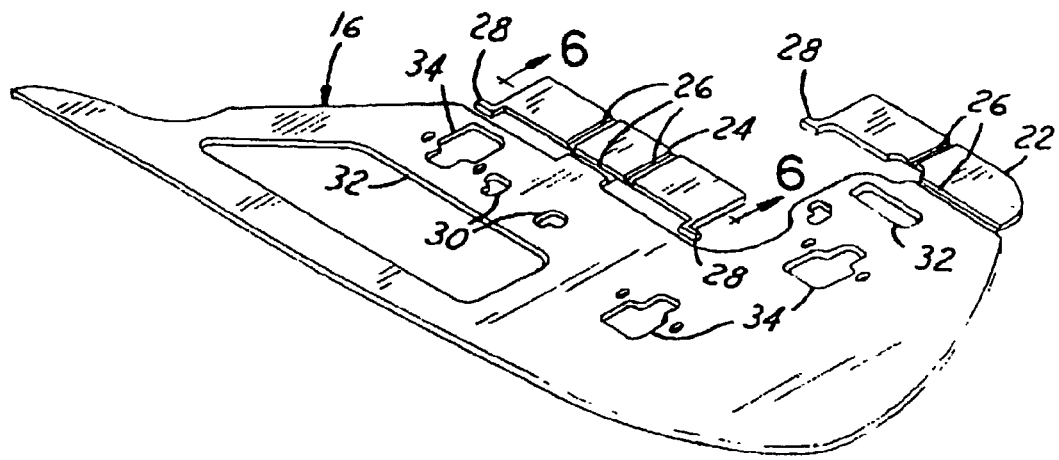
FIG. 4 is a perspective view of the integral inner panel shown in FIG. 2, illustrating the integral inner panel in an unfolded state.
Figure 5:
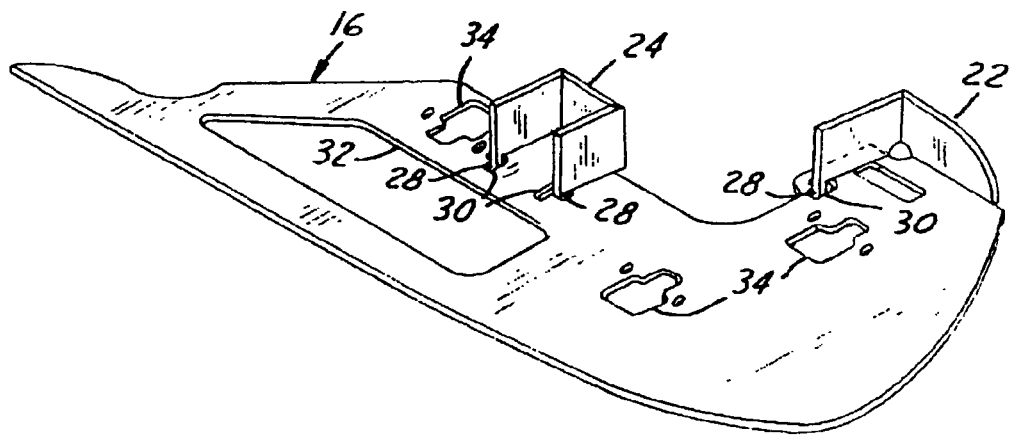
FIG. 5 is a perspective view of the integral inner panel shown in FIG. 2, illustrating the integral inner panel in a folded state.

Referring now to FIGS. 4 and 5, there are shown perspective views of the integral inner panel 16, respectively illustrating the integral inner panel 16 movable between an unfolded state and a folded state. Preferably, as mentioned above, the shelf bracket 22 and the load bearing bracket 24 are integral parts of the integral inner panel 16. These brackets 22, 24 preferably are formed by bending the integral inner panel 16 along predetermined folding lines 26. In this regard, the integral inner panel 16 preferably is a composite sandwich panel comprised of a face sheet material, e.g. a fiberglass material, an aluminum material, and a carbon material, that is placed on both sides of a filler honeycomb material.

Figure 6:
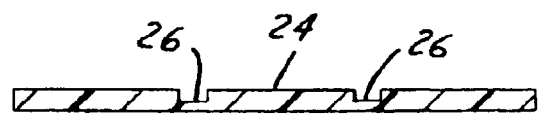
FIG. 6 is a crass-sectional view of the integral inner panel, as shown in FIG. 4 and taken along line 6—6.

As best shown in FIG. 6, the folding lines 26 preferably comprise portions of the integral inner panel 16 characterized by a removal of face sheet and half the thickness of the filler material on one side of the panel over this portion of the panel. In this regard, the inner panel 16 may be bent to a desired degree, e.g. 90 degrees. Of course, however, it is understood that the inner panel 16 may be bend in various other angels to provide the desired shape.

Referring back to FIGS. 4 and 5, the shelf bracket 22 and the load bearing bracket 24 each include at least one locking tab 28 extending therefrom for insertion into at least one anchor slot 30 formed within the integral inner panel 16. After the integral inner panel 16 is bent to the desired position, the locking tabs 28 are intended to engage the inner panel 16 within the anchor slots 30 so as to secure each bracket 22, 24 in a desired position and a desired shape. The residual stiffness of the remaining face ply in the bracket bend area will help the locking tab function by providing a force that will push the tab into the narrow pocket area of the anchor slot 30.

As is known in the art, the integral inner panel 16 may also include one or more clearance holes 28 for permitting portions of the stowage bin 12 to extend therethrough and allowing the integral inner panel 16 to be disposed in a relatively vertical position.

Furthermore, it is also understood that the integral inner panel 16 may include various kinds of integral brackets other than the shelf bracket 22 and the load bearing bracket 24 described above. For example, the integral inner panel 16 may include connector brackets integrally formed therein and extending therefrom. These integral connector brackets would be beneficial because it may function similar to the separate connector brackets 20 described above yet reduce the number of components of the assembly.

Figure 7:
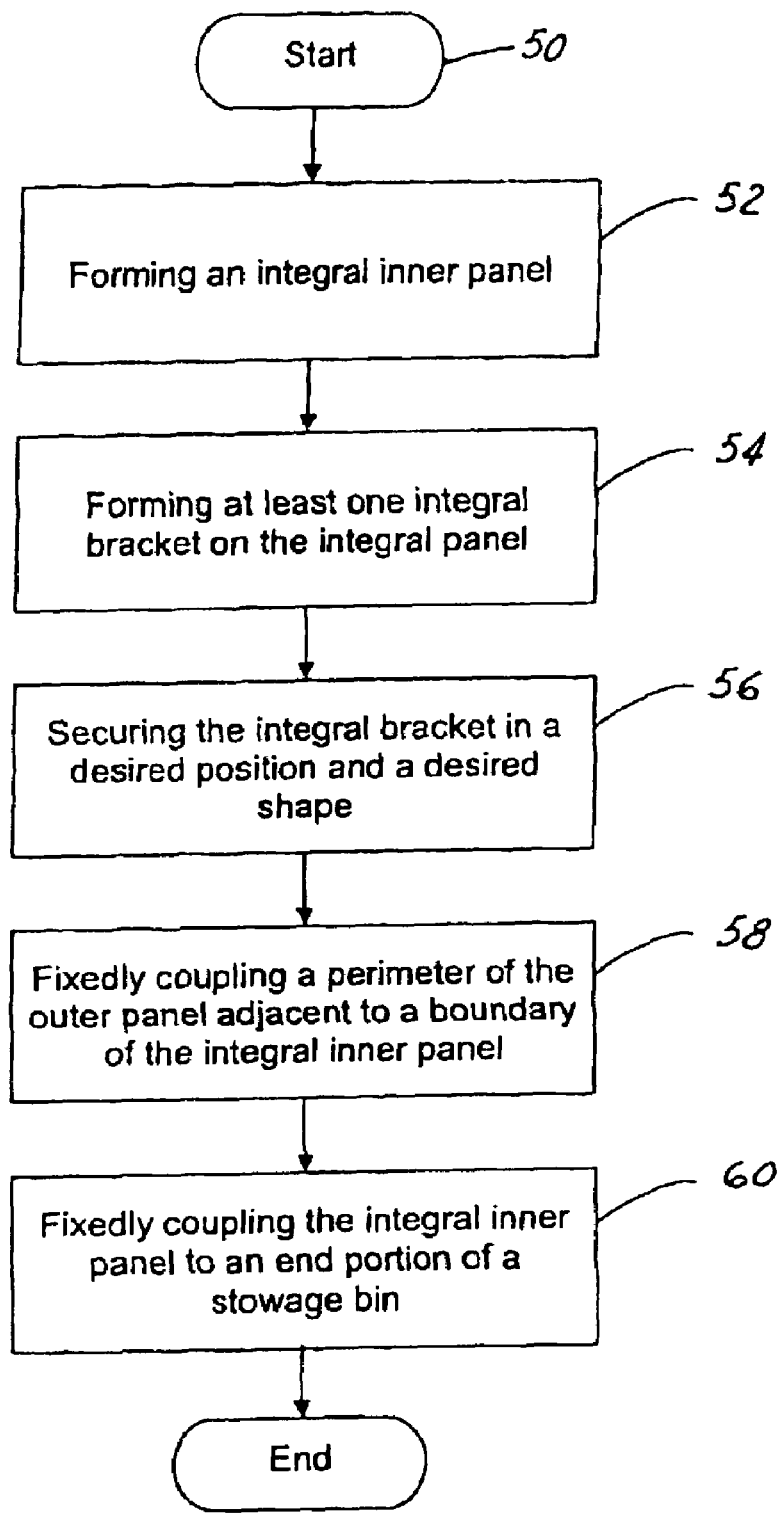
FIG. 7 is flowchart depicting a method for manufacturing the endcap assembly shown in FIG. 1.

Referring now to FIG. 7, there is shown a flowchart depicting a method for manufacturing the endcap assembly 10 shown in FIG. 1. The method commences at step 50 and ten immediately proceeds to step 52.

In step 52, an integral inner panel 16 is formed in manner leaving the panel 16 with at least one folding line 26 for permitting the inner panel 16 to be bent at that folding line 26. This step is preferably accomplished by providing an integral inner panel 16 comprised of a sandwich laminate material.

Preferably, the integral inner panel 16 is formed such that it includes at least one folding line 26 for producing an integral fold-up bracket, namely a shelf bracket 22 and a load bearing bracket 24. Alternatively, however, the integral inner panel 16 may be formed so as to include only one integral fold-up bracket, e.g. only either a shelf bracket 22 or a load bearing bracket 24. These brackets 22, 24 preferably are formed by bending the integral inner panel 16 along the folding lines 26. In this regard, the integral inner panel 16 preferably is a composite sandwich panel comprised of a face sheet material, e.g. a fiberglass material, an aluminum material, and a carbon material, that is placed on both sides of a filler honeycomb material.

Moreover, the integral inner panel 16 is preferably formed in a manner such that each integral fold-up bracket includes at least one locking tab 28 extending therefrom. The locking tab 28 is discussed in further detail in the description for step 58 below. After the integral inner panel 16 has been provided, the sequence then proceeds to step 54.

In step 54, the integral inner panel 16 is bent at each folding line 26 so as to form at least one integral fold-up bracket. As mentioned above, preferably both a shelf bracket 22 and a load bearing bracket 24 are formed. This step may be accomplished by utilizing hand pressure or various other suitable manufacturing methods. Thereafter, the sequence then proceeds to step 56.

In step 56, the locking tabs 28 are inserted into their respective anchor slots 30 and engaged to the inner panel 16 so as to secure each bracket 22, 24 in a desired position and maintain the desired shape of each bracket 22, 24. Then, the sequence proceeds to step 58.

In step 58, a perimeter of an outer panel 18 is fixedly coupled adjacent to a boundary of the integral inner panel 16 so as to create a space between the outer panel 18 and the integral inner panel 16. As is known in the art, this step is preferably accomplished by utilizing a series of connector brackets 20 in connection between the outer panel 18 and the integral inner panel 16. In particular, one end of each bracket 20 may be bolted or otherwise connected to the outer panel 18. The other end of the bracket 20 may extend a hole integrated within the inner panel 16. In addition, bonding adhesives are preferably employed to further secure the outer panel 18 to the integral inner panel 16 via the connector brackets 20.

Bonding adhesives may also be applied to portions of the shelf bracket 22 and the load bearing bracket 24 that are in contact with the outer panel 18. Such adhesive bonding may be advantageous for reducing vibration between the brackets 22, 24 and the outer panel 18. However, as one skilled in the art would understand, the brackets 22, 24 may contact the outer panel 18 without vibrating against the outer panel 18. In this regard, bonding adhesives may not be utilized to attach the brackets 22, 24 to the outer panel 18. Of course, a person skilled in the art would understand there are various other methods of attaching the outer panel 18 to the integral inner panel 16. The sequence then proceeds to step 60.

In step 60, the integral inner panel 16 is fixedly coupled to an end portion of the stowage bin 12. Preferably, a boundary of the integral inner panel 16 is coupled to the front portion of the stowage bin 12 by way of adhesive bonding. Of course, however, various other suitable fasteners may be employed for securing the integral inner panel 16 to the stowage bin 12.

While particular embodiments of the invention have been shown and described, numerous variations and alternate embodiments will occur to those skilled in the art. Accordingly, it is intended that the invention be limited only in terms of the appended claims.

What is claimed is:

1. An endcap assembly for attachment to a stowage bin and defining a front portion of available storage space within the stowage bin, the endcap assembly comprising:
    an integral inner panel having at least one bracket integrally formed therein and extending therefrom, said integral inner panel coupled to an end portion of the stowage bin; and
    an outer panel coupled to said integral inner panel and leaving a space between said integral inner panel and said outer panel;
    said at least one bracket having at least one locking tab extending therefrom;
    said integral inner panel defining at least one anchor slot for receiving said locking tab and holding said at least one bracket in a desired position.

2. The endcap assembly of claim 1 wherein said integral inner panel is comprised of a sandwich panel material.

3. The endcap assembly of claim 1 wherein said at least one bracket is at least one shelf bracket for defining a portion of said space between said inner panel and said outer panel.

4. The endcap assembly of claim 1 wherein said at least one bracket is at least one load bearing bracket for supporting said outer panel and preventing said outer panel from being crushed inwardly toward said integral inner panel.

5. The endcap assembly of claim 2 wherein said sandwich panel material is comprised of at least one of a fiberglass material, a carbon material, an aluminum material, a honeycomb material, and a laminate material.

6. The endcap assembly of claim 1 wherein said outer panel is coupled to said integral inner panel via at least one of a bonding adhesive and at least one connector bracket therebetween.

7. The endcap assembly of claim 1 wherein said integral inner panel has a portion movable between an unfolded state and a folded state, said portion of said integral inner panel held in said folded state via said at least one locking tab secured in said at least one anchor slot.

8. The endcap assembly of claim 7 wherein said portion of said integral inner panel in said folded state is coupled to said outer panel.

9. The endcap assembly of claim 7 wherein said portion of said integral inner panel in said folded state has said at least one bracket extending generally orthogonally therefrom.

10. An endcap assembly for attachment to a stowage bin and defining a front portion of available storage space within the stowage bin, the endcap assembly comprising:
    an integral inner panel having at least one bracket integrally formed therein and extending therefrom, said integral inner panel coupled to an end portion of the stowage bin; and
    an outer panel coupled to said integral inner panel and leaving a space between said integral inner panel and said outer panel;
    said at least one bracket including at least one locking tab extending therefrom;
    said integral inner panel defining at least one anchor slot for receiving said locking tab and holding said at least one bracket in a desired position;
    said integral inner panel further including at least one folding line characterized by a reduced thickness portion of said integral inner panel for bending said integral inner panel along said at least one folding line.

11. The endcap assembly of claim 10 wherein said integral inner panel is a sandwich panel material comprising a face sheet and filler material extending from said face sheet.

12. The endcap assembly of claim 11 wherein said reduced thickness portion of said integral inner panel is comprised of about half the thickness of the adjacent sandwich panel material.

13. The endcap assembly of claim 11 wherein said sandwich panel material is comprised of at least one of a fiberglass material, a carbon material, an aluminum material, a honeycomb material, and a laminate material.

14. The endcap assembly of claim 10 wherein a portion of said integral inner panel is bent about ninety degrees along said at least one folding line.

15. The endcap assembly of claim 10 wherein said at least one bracket is at least one shelf bracket for defining a portion of said space between said inner panel and said outer panel.

16. The endcap assembly of claim 10 wherein said at least one bracket is at least one load bearing bracket for supporting said outer panel and preventing said outer panel from being crushed inwardly toward said integral inner panel.

17. The endcap assembly of claim 10 wherein said outer panel is coupled to said integral inner panel via at least one of a bonding adhesive and at least one connector bracket therebetween.

18. The endcap assembly of claim 10 wherein a portion of said integral inner panel is movable between an unfolded state and a folded state, said integral inner panel held in said folded state via said at least one locking tab secured in said at least one another slot.

19. The endcap assembly of claim 18 wherein said integral inner panel in said folded state is coupled to said outer panel.

20. An endcap assembly for attachment to a stowage bin and defining a front portion of available storage space within the stowage bin, the endcap assembly comprising:
    an integral inner panel coupled to an end portion of the stowage bin, said integral inner panel having at least one reduced thickness portion and at least one bracket extending from said at least one reduced thickness portion; and
    an outer panel coupled to said integral inner panel and leaving a space between said integral inner panel and said outer panel, said at least one reduced thickness portion comprising at least one folding line at least one portion of said integral panel.

21. The endcap assembly of claim 20 wherein said at least one bracket has at least one decreased thickness portion comprising as least one bending line for forming a corner edge on said at least one bracket.

22. The end cap assembly of claim 20 wherein said integral inner panel and said at least one bracket comprise a single-piece construction.

23. The endcap assembly of claim 20 wherein said integral inner panel is a sandwich panel material comprising a face sheet and filler material extending from said face sheet.

24. The endcap assembly of claim 20 wherein said reduced thickness portion of said integral inner panel is comprised of about half the thickness of the adjacent sandwich panel material.

* * * * *